US010592821B2

(12) United States Patent
Denton et al.

(10) Patent No.: US 10,592,821 B2
(45) Date of Patent: Mar. 17, 2020

(54) SELF-LEARNING FAULT DETECTION FOR HVAC SYSTEMS

(71) Applicant: Trane International Inc., Davidson, NC (US)

(72) Inventors: Darryl E. Denton, Tyler, TX (US); Carl L. Garrett, Tyler, TX (US)

(73) Assignee: Trane International Inc., Davidson, NC (US)

( * ) Notice: Subject to any disclaimer, the term of this patent is extended or adjusted under 35 U.S.C. 154(b) by 519 days.

(21) Appl. No.: 15/186,756

(22) Filed: Jun. 20, 2016

(65) Prior Publication Data

US 2016/0370799 A1 Dec. 22, 2016

Related U.S. Application Data

(60) Provisional application No. 62/182,119, filed on Jun. 19, 2015, provisional application No. 62/182,106, filed on Jun. 19, 2015.

(51) Int. Cl.

| | |
|---|---|
| *G06N 20/00* | (2019.01) |
| *G05B 13/02* | (2006.01) |
| *G05B 23/02* | (2006.01) |
| *F24F 11/62* | (2018.01) |
| *F24F 11/30* | (2018.01) |

(Continued)

(52) U.S. Cl.
CPC .............. *G06N 20/00* (2019.01); *F24F 11/30* (2018.01); *F24F 11/62* (2018.01); *G05B 13/0265* (2013.01); *G05B 23/0262* (2013.01); *F24F 11/32* (2018.01); *F24F 11/64* (2018.01)

(58) Field of Classification Search
CPC .... C04B 2103/0061; C04B 2103/0063; C04B 2103/408; C04B 24/165; C04B 24/246; C04B 24/2605; C04B 24/2647; C04B 24/2658; C04B 24/267; C04B 24/2694; C08F 2438/03; C08F 293/005; F24F 11/30; F24F 11/32; F24F 11/62; F24F 11/64; G05B 13/0265; G05B 23/0262; G06N 99/005
See application file for complete search history.

(56) References Cited

U.S. PATENT DOCUMENTS

| | | |
|---|---|---|
| 5,289,176 A | 2/1994 | Novakovich et al. |
| 5,512,890 A | 4/1996 | Everson, Jr. et al. |
| 5,862,322 A | 1/1999 | Anglin et al. |

(Continued)

*Primary Examiner* — Mohammed Shamsuzzaman
(74) *Attorney, Agent, or Firm* — The Salerno Law Firm, P.C.

(57) ABSTRACT

Systems and methods for self-learning fault detection and diagnosis in an HVAC system include a server identifying a fault and one or more predicted causes of the fault based on measurements of operational parameters received from sensors associated with the HVAC system. The operational parameters are compared to evaluation criteria, such as predetermined thresholds, to identify a potential fault. Parameters may be weighted, and optionally scaled to a standardized range to facilitate the diagnosis of HVAC systems of disparate configurations and capacities. Evaluation criteria for each fault are periodically analyzed in view of operational parameter history to identify new criteria having a lower probability of misdiagnosis. Fault detection criteria which are determined to have an unacceptable error rate may be deactivated or flagged for review.

18 Claims, 8 Drawing Sheets

(51) Int. Cl.
*F24F 11/64* (2018.01)
*F24F 11/32* (2018.01)

(56) References Cited

U.S. PATENT DOCUMENTS

| | | | |
|---|---|---|---|
| 5,983,364 A | 11/1999 | Bortcosh et al. |
| 6,065,136 A | 5/2000 | Kuwabara |
| 6,223,544 B1 | 5/2001 | Seem |
| 6,266,721 B1 | 7/2001 | Sheikh et al. |
| 6,279,125 B1 | 8/2001 | Klein |
| 6,343,236 B1 | 1/2002 | Gibson et al. |
| 6,393,490 B1 | 5/2002 | Stiles et al. |
| 6,446,058 B1 | 9/2002 | Brown |
| 6,496,575 B1 | 12/2002 | Vasell et al. |
| 6,679,072 B2 | 1/2004 | Pham et al. |
| 6,681,348 B1 | 1/2004 | Vachon |
| 6,851,621 B1 | 2/2005 | Wacker et al. |
| 6,892,317 B1 | 5/2005 | Sampath et al. |
| 7,000,422 B2 | 2/2006 | Street et al. |
| 7,053,767 B2 | 5/2006 | Petite et al. |
| 7,058,542 B2 | 6/2006 | Hauhia et al. |
| 7,083,109 B2 | 8/2006 | Pouchak |
| 7,120,819 B1 | 10/2006 | Gurer et al. |
| 7,188,482 B2 | 3/2007 | Sadegh et al. |
| 7,191,364 B2 | 3/2007 | Hudson et al. |
| 7,302,313 B2 | 11/2007 | Sharp et al. |
| 7,421,850 B2 | 9/2008 | Street et al. |
| 7,489,138 B2 | 2/2009 | Yu et al. |
| 7,627,455 B2 | 12/2009 | Lenz et al. |
| 7,634,329 B2 | 12/2009 | Liu et al. |
| 7,890,318 B2 | 2/2011 | Castellani et al. |
| 8,332,819 B2 | 12/2012 | McFarland et al. |
| 8,370,020 B2 | 2/2013 | Bauman et al. |
| 8,433,446 B2 | 4/2013 | Grohman et al. |
| 8,437,878 B2 | 5/2013 | Grohman et al. |
| 8,463,442 B2 | 6/2013 | Curry et al. |
| 8,532,808 B2 | 9/2013 | Drees et al. |
| 8,548,630 B2 | 10/2013 | Grohman |
| 8,600,556 B2 | 12/2013 | Nesler et al. |
| 8,606,374 B2 | 12/2013 | Fadell et al. |
| 8,655,491 B2 | 2/2014 | Hadzidedic et al. |
| 8,682,509 B2 | 3/2014 | Goodrich et al. |
| 8,725,298 B2 | 5/2014 | Wallaert |
| 8,781,633 B2 | 7/2014 | Fata et al. |
| 8,843,238 B2 | 9/2014 | Wenzel et al. |
| 8,924,266 B2 | 12/2014 | Shirbabadi et al. |
| 8,935,110 B2 | 1/2015 | Hsieh et al. |
| 9,002,554 B2 | 4/2015 | Chen |
| 9,021,462 B2 | 4/2015 | Gupta |
| 9,026,400 B2 | 5/2015 | Chen et al. |
| 9,135,667 B2 | 9/2015 | Drees et al. |
| 9,152,610 B2 | 10/2015 | Drees et al. |
| 9,196,009 B2 | 11/2015 | Drees et al. |
| 9,286,582 B2 | 3/2016 | Drees et al. |
| 2002/0194550 A1 | 12/2002 | Lopke |
| 2003/0056140 A1 | 3/2003 | Taylor et al. |
| 2004/0203379 A1 | 10/2004 | Witkowski et al. |
| 2004/0218591 A1 | 11/2004 | Ogawa et al. |
| 2004/0249914 A1 | 12/2004 | Flocken et al. |
| 2005/0171736 A1 | 8/2005 | Kang |
| 2005/0275525 A1 | 12/2005 | Ahmed |
| 2008/0129307 A1 | 6/2008 | Yu et al. |
| 2008/0217471 A1 | 9/2008 | Liu et al. |
| 2008/0262860 A1 | 10/2008 | Schneider et al. |
| 2010/0102136 A1 | 4/2010 | Hadzidedic et al. |
| 2010/0102948 A1 | 4/2010 | Grohman et al. |
| 2010/0102973 A1 | 4/2010 | Grohman et al. |
| 2010/0106310 A1 | 4/2010 | Grohman |
| 2010/0106311 A1 | 4/2010 | Wallaert |
| 2010/0106312 A1 | 4/2010 | Grohman et al. |
| 2010/0106316 A1 | 4/2010 | Curry et al. |
| 2010/0106318 A1 | 4/2010 | Grohman et al. |
| 2010/0106809 A1 | 4/2010 | Grohman |
| 2012/0215398 A1 | 8/2012 | Chen et al. |
| 2013/0304278 A1 | 11/2013 | Chen |
| 2014/0074730 A1 | 3/2014 | Arensmeier et al. |
| 2014/0142727 A1 | 5/2014 | Giering et al. |
| 2014/0142904 A1 | 5/2014 | Drees et al. |
| 2014/0207394 A1 | 7/2014 | Madden et al. |
| 2014/0222217 A1 | 8/2014 | Fadell et al. |
| 2014/0249680 A1 | 9/2014 | Wenzel |
| 2014/0262134 A1 | 9/2014 | Arensmeier et al. |
| 2014/0266755 A1 | 9/2014 | Arensmeier et al. |
| 2014/0297208 A1 | 10/2014 | Arensmeier |
| 2014/0354440 A1 | 12/2014 | Grohman et al. |
| 2015/0323211 A1 | 11/2015 | Abiprojo |
| 2015/0378373 A1* | 12/2015 | Sprinkle ............ G05D 23/1917 700/276 |
| 2016/0110238 A1 | 4/2016 | Burugula et al. |
| 2016/0203036 A1* | 7/2016 | Mezic .................. G06F 11/079 714/819 |
| 2016/0313011 A1* | 10/2016 | Melink ............... F24C 15/2021 |

* cited by examiner

SELF-LEARNING FAULT DETECTION FOR HVAC SYSTEMS

CROSS-REFERENCE TO RELATED APPLICATION

This application claims the benefit of and priority to U.S. Provisional Application Ser. No. 62/182,119 entitled "SELF-LEARNING FAULT DETECTION FOR HVAC SYSTEMS" and filed Jun. 19, 2015, and U.S. Provisional Application Ser. No. 62/182,106 entitled "FAULT DETECTION AND DIAGNOSTICS SYSTEM UTILIZING SERVICE PERSONNEL FEEDBACK FOR IMPROVED ACCURACY" and filed Jun. 19, 2015, the entirety of each of which is hereby incorporated by reference herein for all purposes.

BACKGROUND

1. Technical Field

The present disclosure is directed to improving the reliability of HVAC systems, and in particular, to systems, apparatus, and methods for monitoring HVAC system operating characteristics which provide improved diagnosis of system malfunctions.

2. Background

It is well-known that heating, ventilation and air conditioning (HVAC) systems need proper maintenance to ensure proper and efficient operation, and, occasionally, may need diagnosis and repair to correct faults. Various methods and systems for detecting and diagnosing faults that occur in are known in the prior art. These systems often rely on manufacturer's data for fault detection and diagnosis (FDD), but may also implement various algorithms for identifying a fault in a particular system. Known techniques for fault detection commonly employ algorithms which attempt to identify faults by relating anomalies seen in measured performance parameters to an underlying cause. Such techniques rely upon assumptions about the expected performance parameters, e.g., target operating ranges, tolerances, thresholds, and so forth, as they relate to the operational health of various components of the HVAC system. However, these systems may have drawbacks, because differences in HVAC system configuration may render the assumptions unsuitable or inaccurate for some HVAC systems, leading to false positives or undetected faults. An HVAC fault detection system which provides improved fault detection for a wider range of HVAC system configurations would be a welcome advance.

SUMMARY

In one aspect, the present disclosure is directed to an HVAC fault detection method. In an embodiment, the method includes receiving, at a processor, signals indicative of sensed HVAC system operating parameters from a data gathering device of an HVAC system; identifying which of the plurality of sensed HVAC system operating parameters exceeds a parameter threshold to determine a set of error parameters and determining, from the set of error parameters, a potential fault and a corresponding fault threshold. Each error parameter is multiplied by a predetermined weighting factor to generate a weighted error parameter, and the weighted error parameters are summed to generate a summed value. The potential fault is confirmed to be a detected fault if the summed value exceeds the fault threshold. The results are stored in a database as a dataset including a set of optimization parameters comprising the parameter thresholds, the predetermined weighting factors, and the fault threshold.

In some embodiments, the set of optimization parameters further includes parameters such as the sensed HVAC system operating parameters, the set of error parameters, and the detected fault. In some embodiments, the disclosed method includes transmitting a fault message indicative of the identified fault. In some embodiments, an initial set of parameter thresholds is provided. In some embodiments, noise reduction is performed on at least one of the received signals. In some embodiments, an HVAC system operating parameter may be normalized to fall within a standardized range. In some embodiments, the method includes receiving feedback data indicative of whether the detected fault is an actual fault; and storing, in the dataset, the feedback data.

In some embodiments, the disclosed method includes selecting, from the database, a plurality of datasets having a common detected fault; identifying, within the selected plurality of datasets, each unique set of optimization parameters; obtaining, for each of the selected plurality of datasets, a weighted total sum of the optimization parameters; determining a z-score for each set of weighted total sums of the optimization parameters; identifying the set of optimization parameters having the most negative z-score; and utilizing the set of optimization parameters having the most negative z-score as predetermined weighting factors.

In some embodiments, the method includes comparing the z-score of the set of optimization parameters having the most negative z-score to a threshold and, optionally, transmitting an alert and/or inhibiting the detection of the common detected fault in response to the comparing.

In some embodiments, the method includes determining a mean of each set of weighted total sums of the optimization parameters, and determining a standard deviation of each set of weighted total sums of the optimization parameters. In some embodiments, the z-score is computed in accordance with the formula z-score=(fault threshold—mean of each set of weighted total sums)/the standard deviation mean of each set of weighted total sums.

In another aspect, the present disclosure is directed to an HVAC fault detection system. In an embodiment, the system includes a data gathering module configured for receiving HVAC system operating parameters from components of an HVAC system and for transmitting the received HVAC system operating parameters to a recipient device, such as, without limitation, a data analysis module included within a network-connected server computer. The system includes a data analysis module configured for receiving HVAC system operating parameters from the data gathering module. The data analysis module includes a database configured for storing received HVAC system operating parameters, a processor operatively coupled to the database, and a memory operatively coupled to the processor. The memory includes a set of executable instructions which, when executed by the processor, cause the processor to identify which of the plurality of sensed HVAC system operating parameters exceeds a parameter threshold to determine a set of error parameters; determine, from the set of error parameters, a potential fault and a corresponding fault threshold; multiply each error parameter by a predetermined weighting factor to generate a set of weighted error parameters; sum the set of weighted error parameters to generate a summed value; confirm that the potential fault is a detected fault in response to a determination that the summed value exceeds the fault threshold; and store, in the database, a dataset including a set of optimization parameters comprising the parameter thresholds, the predetermined weighting factors, and the fault threshold.

In some embodiments, the data analysis module includes memory having executable instructions that further cause the processor to cause a transmission of a fault message indicative of the identified fault. In some embodiments, the disclosed system includes memory having executable instructions that further cause the processor to normalize an HVAC system operating parameter to fall within a standardized range.

In some embodiments, the data analysis module includes memory having executable instructions that further cause the processor to identify, within the selected plurality of datasets, each unique set of optimization parameters; obtain, for each of the selected plurality of datasets, a weighted total sum of the optimization parameters; determine a z-score for each set of weighted total sums of the optimization parameters; identify the set of optimization parameters having the most negative z-score; and utilize the identified set of optimization parameters having the most negative z-score as predetermined weighting factors. In some embodiments, the data analysis module includes memory having executable instructions that further cause the processor to compare the z-score of the set of optimization parameters having the most negative z-score to a threshold. In some embodiments, the data analysis module includes memory having executable instructions that further cause the processor to transmit an alert in response to the comparing. In some embodiments, the data analysis module includes memory having executable instructions that further cause the processor to compute the z-score in accordance with the formula z-score=(fault threshold—mean of each set of weighted total sums)/the standard deviation mean of each set of weighted total sums.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the drawings wherein.

The various aspects of the present disclosure are described in further detail with reference to the aforementioned figures and the following detailed description of exemplary embodiments.

DETAILED DESCRIPTION

Disclosed herein are methods and related apparatus for analyzing sensed HVAC system operating data and, optionally, receiving data from service technicians, to optimize a set of weights and thresholds over time to improve the accuracy of fault detection and diagnosis. As new datasets containing sensor data indicative of conditions existing within the HVAC equipment are collected, the disclosed method further optimizes the fault detection and identification to provide increasingly consistent and reliable performance. The disclosed methods provide advantages over prior-art techniques for identifying faults from HVAC operation data, particularly when many datasets and/or many different HVAC systems are being analyzed. Many different HVAC systems may be monitored using the same set of optimization parameters. In some embodiments, the disclosed methods perform numerical and statistical processing of measurements and information taken from HVAC systems to diagnose faults. In some embodiments, the disclosed methods include the normalization of incoming data and/or logic for determining HVAC system conditions. By incorporating the optimization of weights and thresholds, data normalization, and fault detection logic, a fault detection system in accordance with the present disclosure is able to provide improved fault detection accuracy over existing fault detection methods.

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure may be described herein in terms of functional block components, code listings, optional selections, page displays, and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Figure 1A:
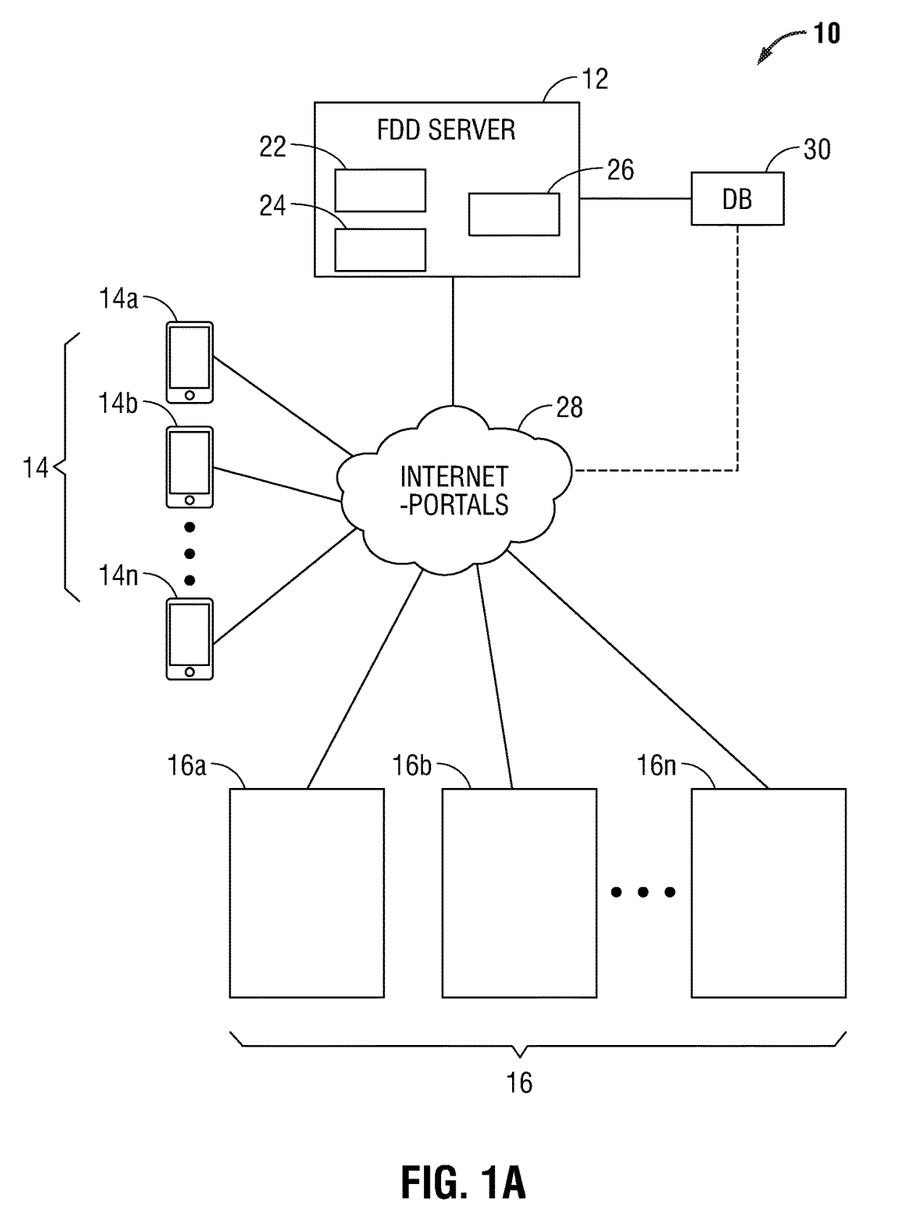
FIG. 1A is a schematic block diagram representation of an embodiment of a system of the present disclosure.

Referring to an embodiment of a system 10 of the present disclosure as shown in FIG. 1A, for example, in various embodiments, the hardware and/or software components for implementing one or more of the functional blocks or method steps may be implemented on one or more server(s) 12 accessing data from a plurality of HVAC systems 16, or distributed between any combination of one or more server(s) 12 and a user device 14 operably connected to the one or more server(s) 12.

The user devices of the present disclosure may be mobile devices, such as a smart phone or tablet, that include a software application (app) installed therein for enabling service technicians to communicate information obtained from servicing a reported fault in an HVAC system. In embodiments, user devices may also include any other suitable device, including a computer, laptop, diagnostic unit (multimeter) and so on, for entry and transmission of the information via a web-based interface or a dedicated interface, for example.

Similarly, the software elements of the present disclosure may be implemented with any programming or scripting language such as C, C++, C#, Java, COBOL, assembler, PERL, Python, PHP, Ruby, or the like, with the various algorithms being implemented with any combination of data structures, objects, processes, routines or other programming elements. The object code created may be executed by any device, on a variety of operating systems, including without limitation Apple OSX®, Apple iOS®, Google Android®, HP WebOS®, Linux, UNIX®, Microsoft Windows®, and/or Microsoft Windows Mobile®.

It should be appreciated that the particular implementations described herein are illustrative of the disclosure and its best mode and are not intended to otherwise limit the scope of the present disclosure in any way. Examples are presented herein which may include sample data items which are intended as examples and are not to be construed as limiting. Indeed, for the sake of brevity, conventional data networking, application development and other functional aspects of the systems (and components of the individual operating components of the systems) may not be described in detail herein. It should be noted that many alternative or additional functional relationships or physical or virtual connections may be present in a practical electronic system or apparatus.

As will be appreciated by one of ordinary skill in the art, the present disclosure may be embodied as a method, a device, e.g., a server device, configured to implement the methods disclosed herein, and/or a computer program product. Accordingly, the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., flash memory, USB thumb drives) and/or the like.

Computer program instructions embodying the present disclosure may also be stored in a computer-readable memory that can direct a computer or other programmable data processing apparatus to function in a particular manner, such that the instructions stored in the computer-readable memory produce an article of manufacture, including instruction means, that implement the function specified in the description or flowchart block(s). The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the present disclosure.

Referring again to FIG. 1A, for example, in one embodiment, the server 12 includes a processing device or devices 22, memory including computer readable memory or storage 24 for storage of software, instructions, or executable code, which when executed by the processing device(s) 22 causes the processing device(s) 22 to perform methods or method steps of the present disclosure, which may be embodied at least in part in programming instructions 26 stored on or retrievable by the server 12. It will be appreciated by those of ordinary skill in the art that such components 22, 24 and programming instructions 26 for performing the methods or method steps of the present disclosure may be also be distributed among various devices, which may include user devices 14, such as computers, laptops, mobile devices, phones, tablets, and so on, and may also, in embodiments, include programmable logic installed in components of the HVAC system(s) 16.

The skilled artisan will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

The disclosed systems and/or methods may be embodied, at least in part, in application software that may be downloaded, in whole or in part, from either a public or private website or an application store ("app store") to a mobile device. In another embodiment, the disclosed system and method may be included in the mobile device firmware, hardware, and/or software. In another embodiment, the disclosed systems and/or methods may be embodied, at least in part, in application software executing within a webserver to provide a web-based interface to the described functionality.

In yet other embodiments, all or part of the disclosed systems and/or methods may be provided as one or more callable modules, an application programming interface (e.g., an API), a source library, an object library, a plug-in or snap-in, a dynamic link library (e.g., DLL), or any software architecture capable of providing the functionality disclosed herein.

The term "sensors" as used herein refers collectively to both sensors and transducers as commonly used in the art, and includes sensors associated with a particular piece of equipment and/or control unit or thermostat in the HVAC system, such as a temperature sensor in a thermostat. Sensors may be located on or operably connected to certain HVAC equipment. Other sensors co-located with an HVAC system may, or may not be operably connected to HVAC equipment, but may still be used in accordance with methods of the present disclosure to analyze the data collected for detecting and diagnosing a fault in the HVAC system. Examples of sensors from which data may be collected for analysis in accordance with the present disclosure include, but are not limited to, temperature, humidity, pressure, occupancy, smoke, light, motion, security sensors, and so on. Data that may be acquired from sensors and/or equipment (which may include sensors or embedded controllers) includes, but is not limited to, measured data readings (e.g., temperature, pressure, humidity, and so on), set point (e.g., a user-defined temperature setting), current state (e.g., an "occupied" or "unoccupied" reading from an occupancy sensor), and modes of operation (e.g., heat or cool mode of a thermostat).

Referring to FIG. 1A, an embodiment of a system 10 of the present disclosure for detecting and diagnosing faults in an HVAC system is shown. The system 10 includes a server 12 communicably coupled to a plurality of HVAC systems 16, via the Internet 28, for example, and specially configured to implement and execute the methods of the present disclosure. The server 12 may also be configured to establish communications with a plurality of user devices 14 utilized by field service technicians and to send various notifications and instructions to the user devices 14 regarding any faults detected in the HVAC systems 16 in accordance with the present disclosure. In embodiments described further hereinbelow, the user devices 14 are enabled to receive such notifications from the server 12 and to respond by sending information regarding the fault reported by the server 12. In embodiments, a database 30 is communicatively coupled to the server 12 for storing such information and fault data. The database 30, in embodiments, may also be accessible to the service technicians' devices 14, via the Internet 28, for example, for storing the feedback information from the service technicians.

Figure 1B:
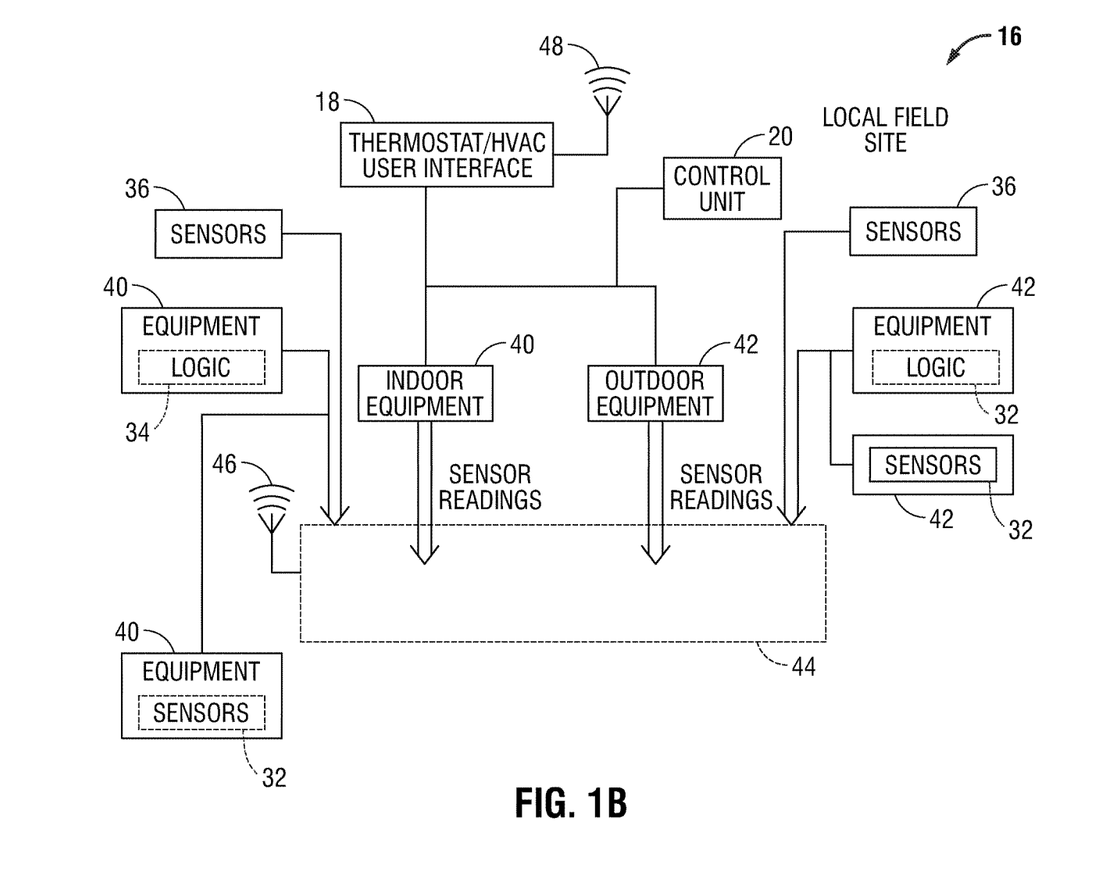
FIG. 1B is a schematic block diagram representation of an embodiment of a heating, ventilation and air conditioning system that is communicably coupled to the embodiment of the system of FIG. 1A.

Referring to FIG. 1B, by way of example, an HVAC system 16a typically includes a thermostat 18 and may include various additional control units 20, each of which may be operable via a touch-screen panel as well as via a separate user device operated by a homeowner or system operator. Additional equipment in the HVAC system 16a may include, but is not limited to, furnaces and heating equipment, air conditioners, filters, air purifiers, ventilation equipment, chillers, pumps, and air handlers.

Equipment in the HVAC system 16a may include both indoor 40 and outdoor equipment 42, each of which may include sensors 32 operably connected to and/or embedded in the equipment. Some equipment may include embedded logic controllers 34 for monitoring and controlling operation.

Additional sensors 36 may be co-located with the system 16a and may or may not be operably connected to equipment within the HVAC system 16a. Such sensors 36 may include, but are not limited to, occupancy, smoke, light, motion, security, humidity, pressure sensors, and so on. In accordance with the present disclosure, data from these sensors 32, 36 and logic controllers 34 may be collected, stored, and analyzed by the server 12 to assess current operational parameters and trends in the equipment and HVAC system 16a, for detection and diagnosis of faults in accordance with predetermined logic conditions.

As will be described further below, various types of data are generated by the sensors associated with the plurality of HVAC systems 16. Referring still to FIG. 1B, embodiments of the HVAC system 16a may include an electronic gathering device 44 configured to acquire data from any components associated with the system 16, including the control unit(s) 20, thermostat 18, both indoor 40 and outdoor equipment 42, and associated sensors 32, 36, and forward the data via the Internet 28, for example, to the server 12 for processing.

The electronic gathering device 44 is operably connected to the server 12 for transmission of the acquired data thereto and configured for transmitting the data by any suitable connection, either wired or wireless 46, of any appropriate type, including but not limited to WiFi, cellular, Ethernet, POTS via modem, and so on.

In some embodiments, the thermostat 18 of the HVAC system 16 is operably connected to the data gathering device 44, has Internet connectivity 48, e.g., WiFi, Ethernet, and so on, and can provide the data pathway from the electronic data gathering device 44 to the central remote server 22 via the Internet 28. Any combination of the thermostat 18 and the optional electronic data gathering device 44, or any other method known in the art, may be used to transmit the data, including measurements of various operating parameters, from the HVAC systems 16 to the server 12 for fault detection and diagnosis.

Figure 2:
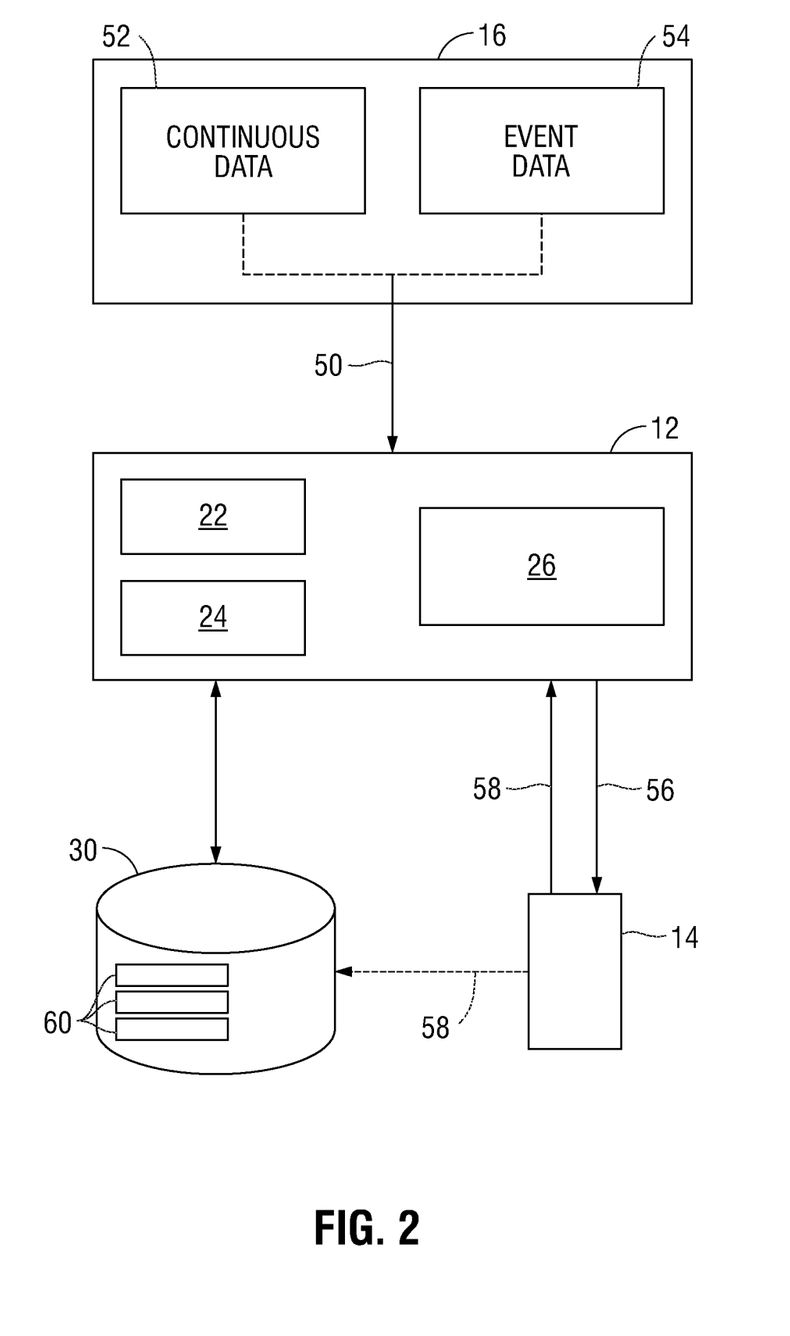
FIG. 2 is a block diagram representation of data flow in an embodiment of a system of the present disclosure.

FIG. 2 illustrates a flow of data between an HVAC system 16a, a service technician's device 14, which may be a mobile device, and an embodiment of a server 12 in accordance with the present disclosure. The measured data 50 from the sensors 32, 36, and the like associated with the HVAC system 16a may include continuous data 52 and event data 54. The measured data is collected and transmitted to the server 12 for monitoring and analysis and may also be stored in the database 30 as a dataset 60. A dataset 60 includes the measured and derived parameters that are measured or calculated from measured parameters that were acquired at essentially the same point in time, or alternatively over a relatively short period of time, such that the HVAC system operating conditions are assumed to be essentially stable over that period of time. The data 50 can include continuous measurements 52 of various operational parameters, such as, but not limited to, indoor temperature, outdoor temperature, pressure, system modes, setpoints, indoor humidity, compressor power, and so on. The data 50 may also include discrete system operation events 54, such as, but not limited to, calls for cooling operation, recorded events of a compressor turned on or off, changes in setpoints and/or system modes, and any other event that is triggered, for example, by a change in a system operating condition. The measurements of the operational parameters that are stored in the database 30, therefore, can be any combination of continuously acquired data 52 and discrete, event data 54.

In addition to the parameter data, dataset 60 also contains a record of the fault diagnoses, and, when available, feedback on whether or not the fault diagnosis was correct via storage of the correct fault diagnosis. Note that only some of the stored datasets might contain the correct fault diagnosis since feedback for every fault diagnosis may not be provided by service personnel in every instance.

The server 12 detects and diagnoses faults based on the measurements 50 of the operational parameters acquired from the HVAC system 16a as described further hereinbelow. If a fault is detected, a notification of the fault with instructions 56 may be sent by the server 12 to a user device 14 accessible by a service technician. Upon correction of the fault, the service technician provides information 58 associated with the correction via the user device 14 to the server 12, which may also be stored in the database 30 by the server 12, or directly to the database 30. In embodiments, the database 30 may include records 60 that include all faults detected by the server 12, along with the FDD-generated fault diagnoses, the measured dataset 50 to which each FDD diagnosis was applied, and the feedback information provided via the user device 14, including whether or not the FDD fault diagnosis provided by the server 12 was correct. These records 60 are used by the server 12, or in other embodiments of the present disclosure, by a third-party server, to optimize the fault detection and diagnosis logistics as described further herein.

Figure 3A:
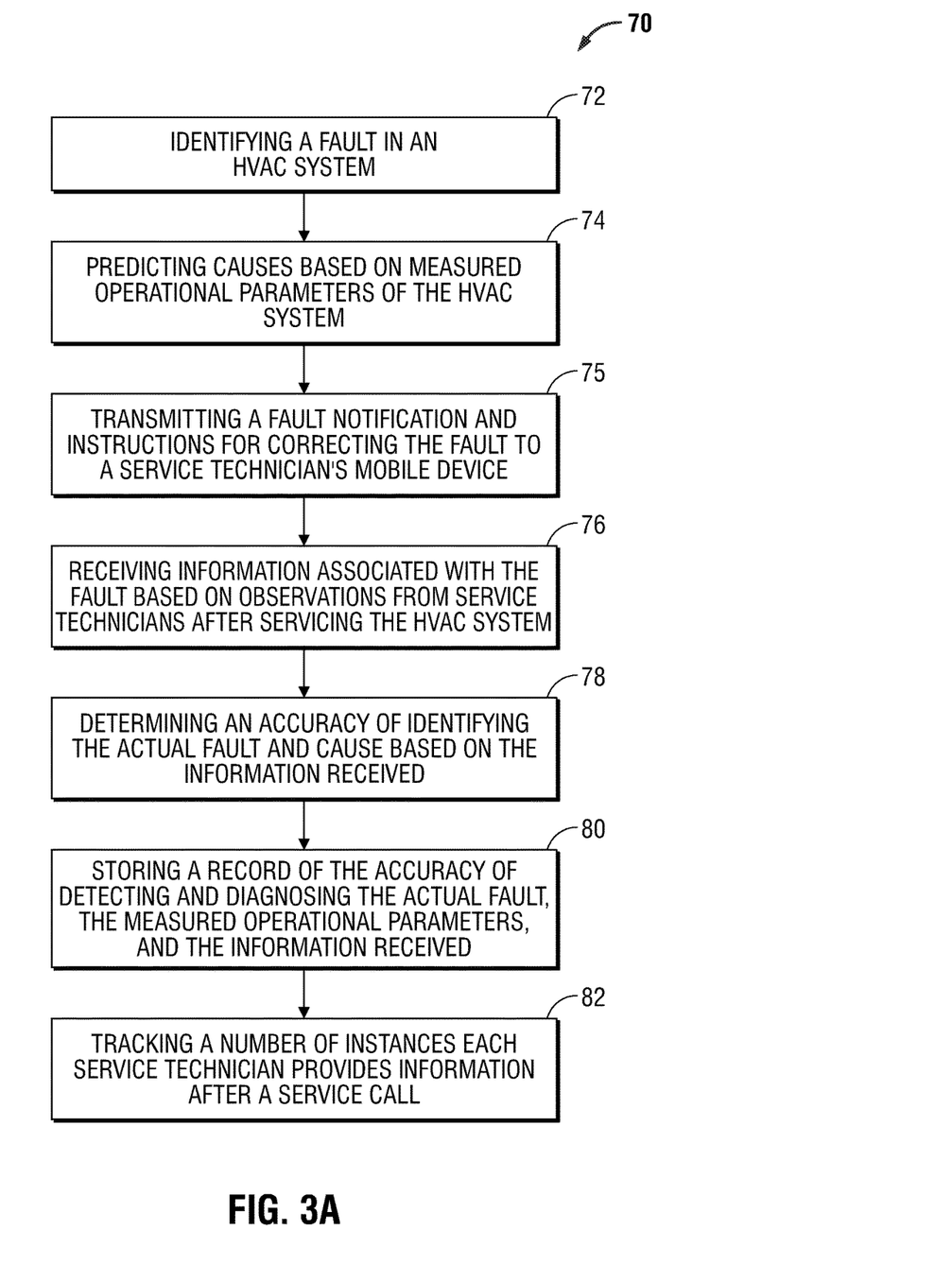
FIG. 3A is a flowchart illustrating a method of fault detection and diagnosis in accordance with an embodiment of the present disclosure.

FIG. 3A illustrates embodiments of a method 70 of the present disclosure to detect and diagnose faults in an HVAC system 16 that is operably connected to a server 12 as described above. Referring also to FIG. 2, in accordance with the method 70, the server identifies, at 72, a fault in an HVAC system 16 and determines, at 74, one or more predicted causes of the fault based on the measurements of operational parameters 50 that are passed to the server 12 from the HVAC system 16. In embodiments, the server transmits, at 75, a fault notification and instructions for correcting the fault to a service technician's mobile device. The server 12 receives information associated with the fault at 76 from the service technician to which the fault notification was issued and also accumulates information from other service technicians based on their observations in servicing the same reported fault in past service calls. The information reported by the service technicians includes the corrective measure(s) that were implemented to successfully correct the fault. The information may also include a listing of corrective measure(s) that were implemented without success, including any measures that the service technician was originally instructed to implement to correct a suspected cause of the fault, as diagnosed by the server 12.

For example, the service technician may determine the actual cause of the fault by making suggested changes to correct the operational error. The service technician may have attempted certain corrections that were provided in the instructions along with the fault notification, or may try other changes based on his or her prior experience. Such corrective measures may include, for example, adding a charge, removing a charge, replacing a component, correcting an airflow, or modifying a thermostat configuration in the heating, ventilation and air conditioning system. In embodiments, the information provided at 76 by the service technicians preferably includes this level of detail for implementation by the FDD server 12.

By comparing the information from the service technicians with the fault and predicted cause that the server determined from the measured parameters, the server, at 78, determines an accuracy of the algorithm and parameters used to identify and diagnose the fault.

In additional embodiments, the server, at 80, stores a record of the fault identified by the server and the one or more predicted causes, the accuracy of detecting and diagnosing the actual fault, the measured operational parameters used to detect and diagnose, and the information about the actual fault and causes received from the service technicians.

In embodiments, at 82, the server 12 also identifies the service technician associated with each instance of information received and tracks the number of instances associated with each service technician. In this way, a reward system may be implemented to incentivize the service technicians to provide helpful information after each service call.

Figure 3B:
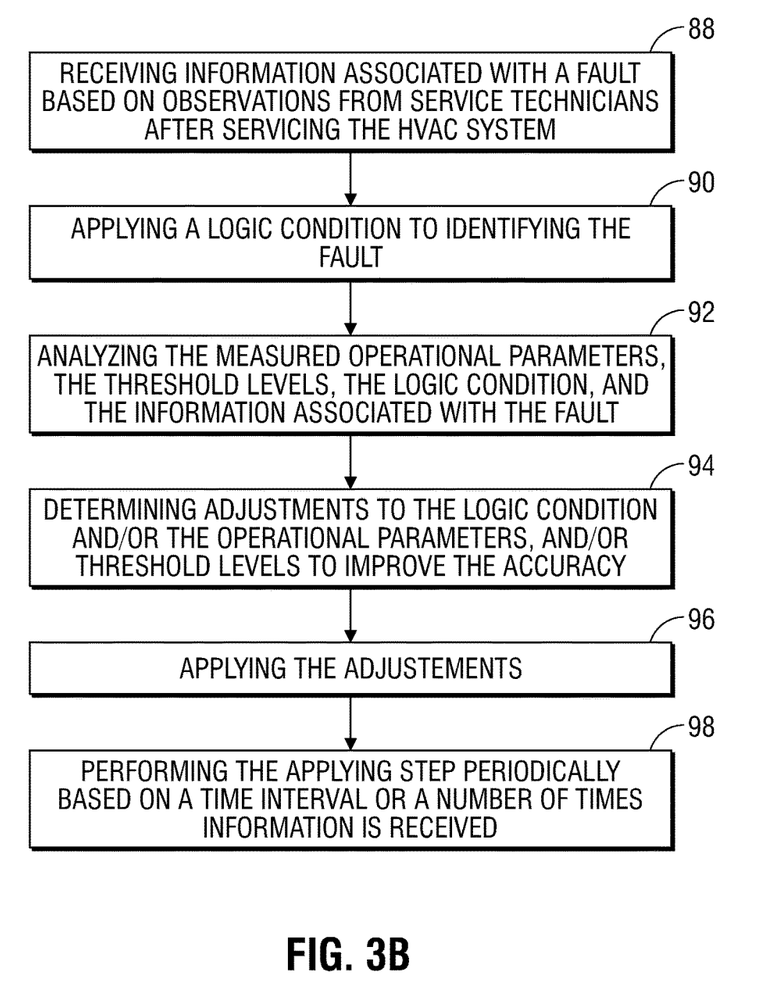
FIG. 3B is a flowchart illustrating another method of fault detection and diagnosis in accordance with an embodiment of the present disclosure.

Referring now to FIG. 3B, in embodiments, the information associated with a fault is collected by FDD server 12 from service technicians, at 88, via the service technicians' user devices. The method includes the server 112, or server 12, applying a logic condition, at 90, to determine whether or not a fault exists and to identify the fault. The logic condition associated with the fault is based on measurements of particular operational parameters, and a predetermined threshold level for each of the operational parameters.

Figure 4:
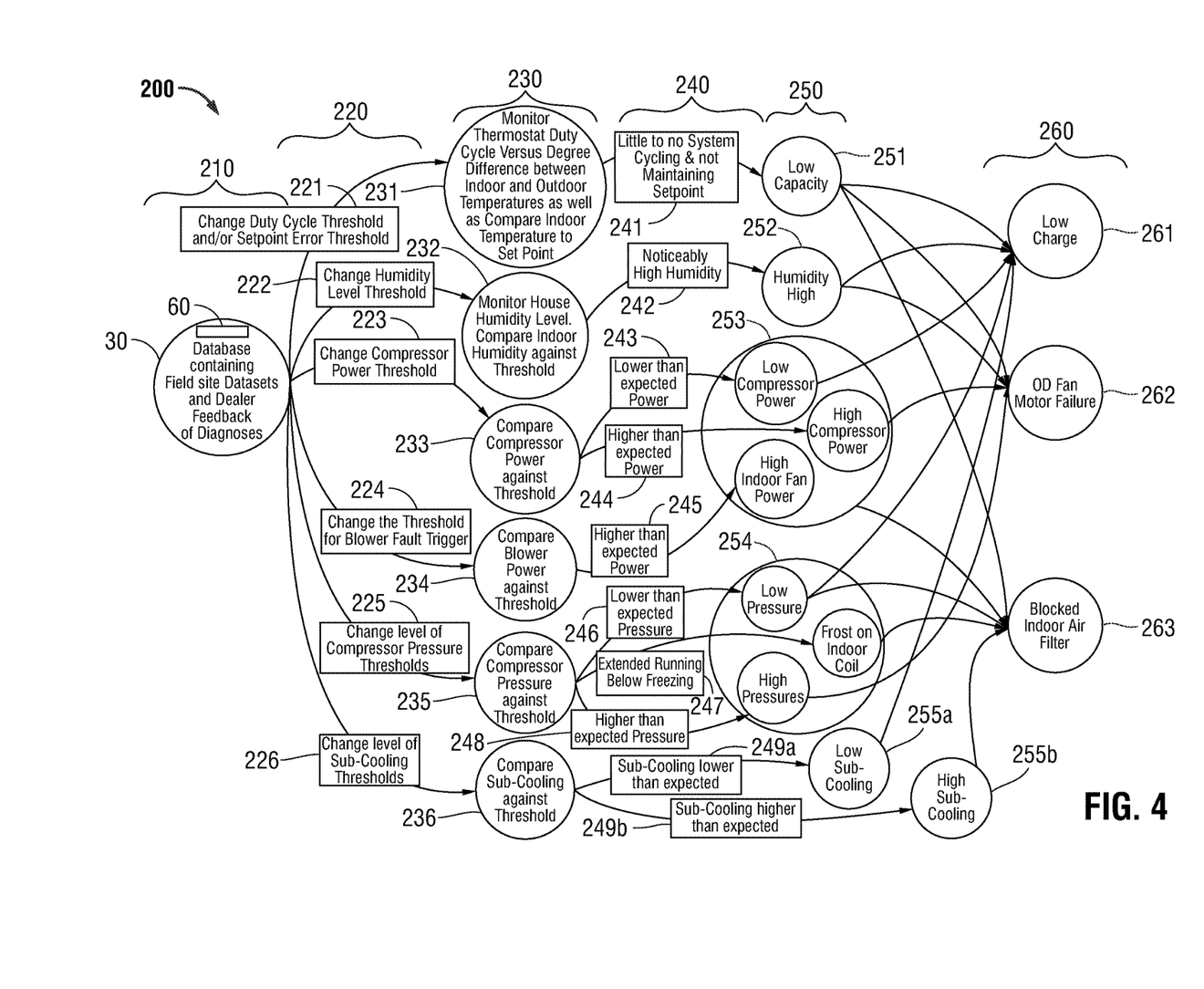
FIG. 4 is a state diagram depicting logic conditions for fault diagnosis in accordance with an embodiment of the present disclosure.

FIG. 4 is a state diagram 200 that illustrates logic conditions for fault diagnosis. Server database 30 stores datasets 60 that include field site measured parameters, e.g. indoor temperature, outdoor temperature, system mode, setpoint, indoor humidity, compressor power, etc., and system operation events, e.g. call for cooling operation, compressor turned on, compressor turned off, setpoint changed, etc. The parameters can be any combination of continuous, e.g. temperature, pressure, power, etc., and discrete (attribute) type data, e.g. system mode, call for cooling, compressor on or off, etc. It should be understood that the parameters described herein are illustrative of example embodiments, and that additional or alternative parameters may be advantageously utilized within the sprit and scope of the present disclosure. Database 30 contains a record of all FDD generated fault diagnoses, the dataset to which each FDD diagnosis was applied, and, when available, feedback on whether or not the fault diagnosis was correct via storage of the correct fault diagnosis.

Optimization module outputs 220 represent the result of adaptive (learning) logic which uses the information in database 30 to adjust the HVAC system operating conditions detection threshold levels 221-226 for the measured HVAC system parameters and derived (calculated) parameters. Threshold comparisons 230 illustrate the FDD system's comparison of parameters to the current thresholds for each parameter to detect specific HVAC system operating conditions 231-236 for each dataset. Detected HVAC system operating conditions 240 represent HVAC fault symptoms 241-249b and corresponding detected HVAC system operating conditions 250 that potentially indicate that a fault exists within the subject HVAC system. Diagnosable faults 260 represent the faults 261-263 that are diagnosable by the FDD system.

The parameters from a dataset 60, some of which may be normalized, are compared to their corresponding thresholds at 230. For each HVAC system operating condition detectable by the FDD system, when the corresponding parameter's value exceeds its threshold level, or the corresponding collection of parameters' values exceed their corresponding thresholds, the HVAC system operating condition in question will be detected as either having occurred (e.g., true, resulting in a value of one, "1") or as not having occurred (e.g., false, resulting in a value of zero, "0"). Accordingly, each detectable HVAC system operating conditions identified at 250 (e.g., low capacity, high humidity, compressor anomalies, pressure anomalies, subcooling anomalies) will produce a vote of "1" or of "0" simultaneously at the input of each diagnosable fault 260. Additional data, such as attribute data, may be used during threshold evaluation 230 for qualifying continuous-type data.

To make a diagnosis, each operating condition vote of 1 or 0 that is logically routed to a given diagnosable fault 260 is multiplied by a unique weighting value, e.g. a predetermined value, e.g. between 0 and 100, and then the results are summed to obtain a weighted total sum for that diagnosable fault. The weighted total sum is then compared to a unique threshold level for the diagnosable fault in question. If the weighted total sum exceeds the threshold that has been predetermined for a given fault, then the FDD system is considered to have diagnosed the fault in question and will communicate the diagnosed fault in all of the appropriate ways at the appropriate times to the appropriate users as defined by other aspects of the FDD system.

The HVAC system operating condition detection thresholds, the weights applied to the operating condition votes, and the diagnosable fault thresholds are collectively referred to as optimization parameters. A set of optimization parameters is determined and used for obtaining a diagnosis for each diagnosable fault 260. A threshold may include a range and/or a plurality of ranges. For example, comparison 235 ("compare compressor pressure against thresholds") may utilize more than two (e.g., low and high) pressure thresholds. In a non-limiting example, compressor pressure may be compared to two different low pressure detection thresholds; one for a low pressure level condition optimized for diagnosing "low charge" at 261 and another at a different low pressure level condition optimized for diagnosing "blocked indoor air filter" at 263.

New datasets for each HVAC system are received via an internet connection to the thermostats, system controllers, and diagnostic data modules located at and/or within HVAC systems in the field, and processed by the diagnostic logic. Some datasets may optionally not be analyzed by the FDD system, for instance, if datasets for any given HVAC system are received more frequently than necessary for making a timely diagnosis of faults for that particular HVAC system.

In some embodiments, additionally or alternatively to the HVAC system operating conditions detection logic at 250 producing binary votes at their outputs, the HVAC system operating conditions detection logic 250 may produce stepped outputs or continuous sliding scale type outputs as a function of how far the parameter values are above their respective thresholds.

In some embodiments, the weighted total sum for each diagnosable fault divided by the detection thresholds for each fault can optionally be used as a measure of the relative likelihood for each fault having occurred as well as used for sorting the diagnosed faults accordingly. The resulting sort order of the diagnosed faults may then be communicated by the FDD system as an indication of the highest to lowest relative probability of each fault having occurred within the HVAC system represented by the dataset.

In embodiments of the present disclosure, logic conditions are established and applied by the server 12 for identifying faults based on measurements of the operational parameters. For example, a threshold value may be predetermined for a particular operational parameter, and a logic condition established that determines a particular fault exists, under certain system operating conditions, when a particular operational parameter either exceeds, or drops below, the predetermined threshold value. In other embodiments, the logic condition determines the existence of a fault based on an analysis of measurements of a predetermined set of operational parameters and their predetermined threshold values. The accuracy of an FDD may be determined in view of the logic condition applied, the set of operational parameters selected by the logic condition to identify a fault, and the predetermined threshold values for those operational parameters.

The information provided by the service technicians can help optimize the logic condition for defining a fault, for example, by determining whether the optimal combination of operational parameters are being applied to predict that a fault exists, as well as to optimize the threshold values and algorithms used to determine which fault out of all possible faults for a particular HVAC system exists. In particular, if the information provided by the service technicians indicates that the actual fault and/or cause were found to differ from the predicted fault, this information is utilized by the optimization logic modify the fault threshold parameters, and, additionally or alternatively, to modify the weighting parameters, in order to improve the performance of the fault detection logic. Accordingly, embodiments of the method further include analyzing, at 92, the measurements of the operational parameters, the threshold levels, the logic condition, and the information, and determining, at 94, adjustments to the logic condition and/or the operational parameters, and/or one or more threshold levels of the operational parameters to improve the accuracy of the FDD by the server 12.

In embodiments, the adjustments determined at 94 are applied to the server 12 at 96 for improving the accuracy of the fault detection and diagnosis. Accordingly, as more information is received from the service technicians, the accuracy of the FDD by the server 12 is further improved. In additional embodiments, the server 12 performs the applying step periodically, at 98, based on a predetermined time interval or on a predetermined number of instances of receiving the information.

Before the FDD system can compare each parameter to its corresponding threshold, some of the parameters may first be normalized. In one non-limiting example, a five ton HVAC system will consume significantly more power than a three ton HVAC system under the same operating conditions and will generate significantly more refrigeration capacity. The five ton and three ton system power consumptions are normalized to a range of 0 to 1, 0 to 100, or any suitable scale (where, in this example, 0 represents no power and 1 or 100 represents maximum power). This enables the normalized power of different tonnage systems to be compared to a similarly-normalized compressor power threshold level. Normalization may be applied to other parameters as well, e.g., blower power in this example. Optionally or alternatively, other parameters may be normalized, e.g. subcooling, indoor air humidity level, indoor and outdoor temperatures, time, and the like.

Figure 5:
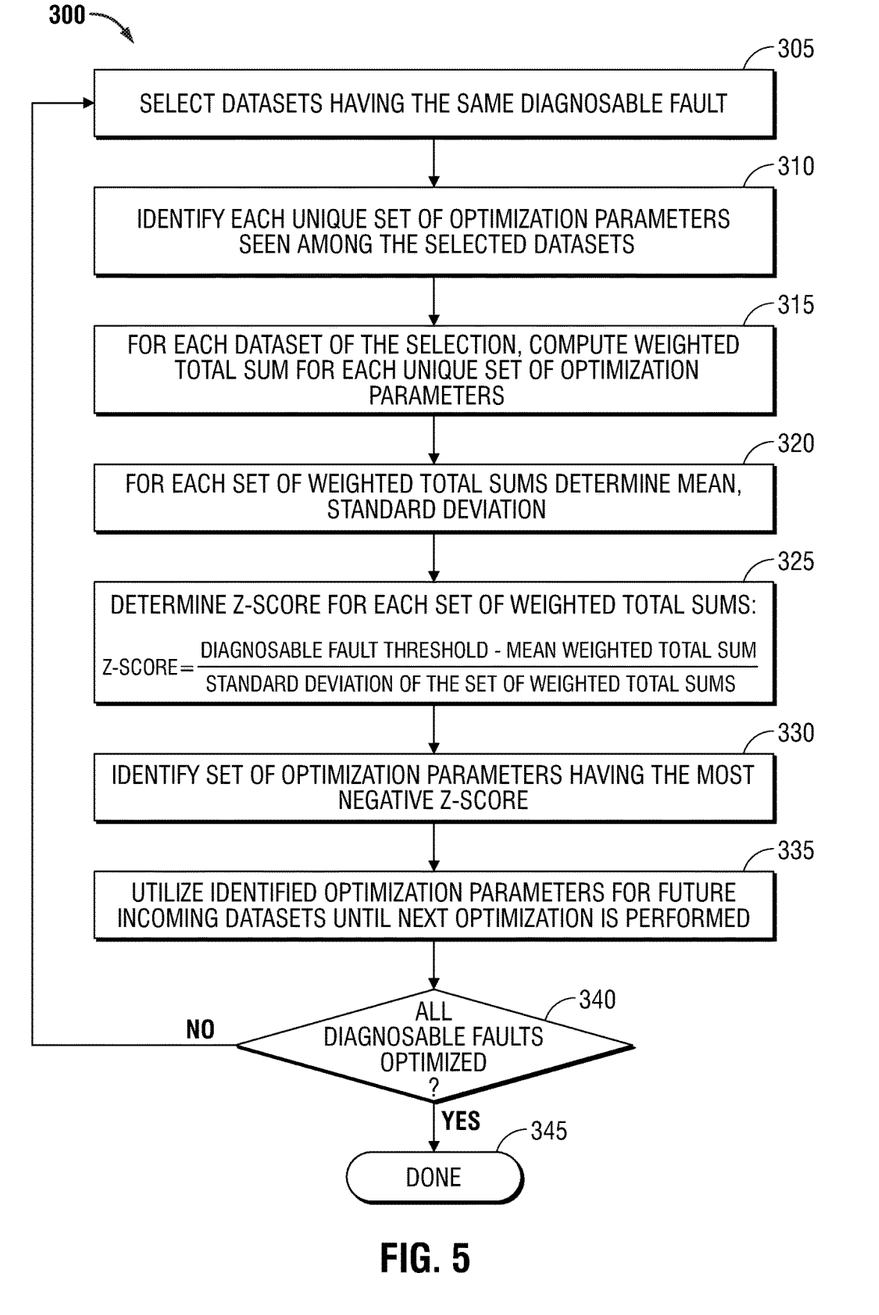
FIG. 5 is a flowchart illustrating a method of fault detection and diagnosis optimization in accordance with an embodiment of the present disclosure.

Each operating condition to be detected will have at least one corresponding threshold. Initially, the FDD system includes predetermined threshold levels and parameters for detecting HVAC system operating conditions. Subsequently, the accuracy of thresholds used to identify and diagnose faults is periodically re-evaluated by optimization module 300 (FIG. 5). Optimization module 300 uses the information in database 30 to adjust the HVAC system operating conditions detection threshold levels for the measured HVAC system parameters and derived (e.g., calculated) parameters.

Turning now to FIG. 5, optimization module 300 seeks to optimize the optimization parameters on a per-diagnosable fault basis. In step 305, datasets for each diagnosable faults are selected for processing. The collected datasets are processed for each specific set of optimization parameter values being analyzed to produce a set of weighted total sums for each diagnosable fault. Each set of optimization values within the selected dataset are identified (step 310). The weighted total sum for each unique set of optimization values are determined in step 315, and in step 320, a mean and a standard deviation are determined. In step 325, a z-score is computed when processing is completed for each dataset. Each z-score is computed using the following equation: (the diagnosable fault threshold—the mean weighted total sum)/the standard deviation of the set of weighted total sums.

The most negative z-score is associated with the set of optimization parameter values that statistically represent the lowest probability of the FDD system incorrectly diagnosing faults going forward (e.g., in future diagnosis). This conclusion is based on the observation that each calculated set of weighted total sums approximates a normal distribution. Therefore, the goal of the optimization module is to obtain the most negative z-score possible, per diagnosable fault, by varying, and effectively searching through, combinations of optimization parameter values until the most negative z-score is found by the module (step 330). The task of searching through combinations of optimization parameter values within the allowed ranges thereof may be accomplished via the Newton-Raphson numerical analysis method modified for this particular application, e.g. approximating derivatives by using the slope of a line through two adjacent points, adding logic to skip over optimization parameter values that result in no change in the weighted total sum output, etc., or may be performed using any other suitable numerical analysis approximation method.

Advantageously, optimization module 300 is applicable to datasets that contain field service personnel provided feedback of the correct fault diagnosis (including the non-existence of a fault), computer simulations, lab-obtained datasets, and/or any combination thereof.

Figure 6:
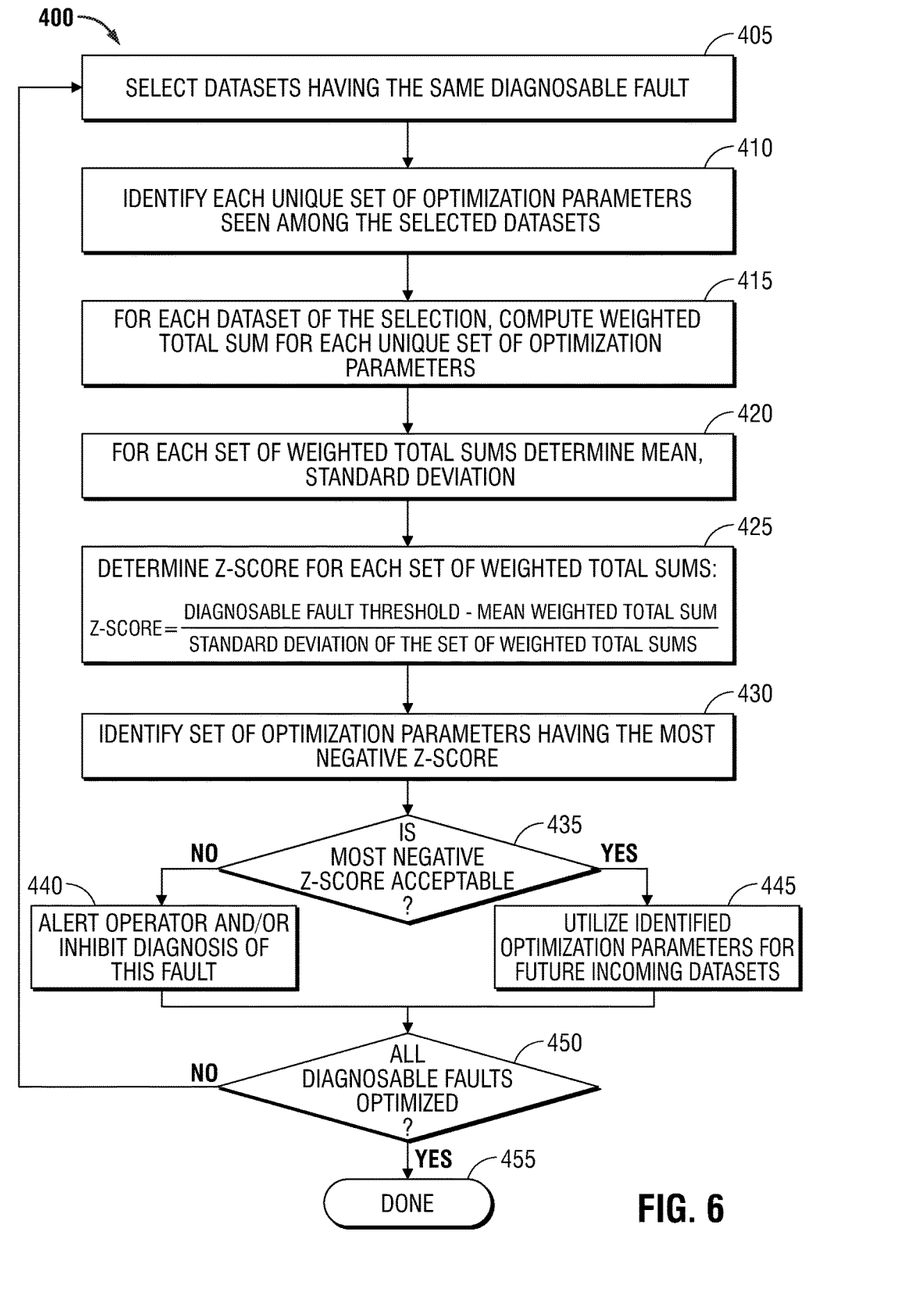
FIG. 6 is a flowchart illustrating another method of fault detection and diagnosis optimization in accordance with an embodiment of the present disclosure.

Turning now to FIG. 6, one measure of the estimated risk of misdiagnosing any specific fault is equal to the tabled, or calculated, value of the standard normal probability of the z-score that is associated with the optimum set of optimization parameter values implemented for the diagnosable fault under analysis. Therefore, in an embodiment, optimization module 400 may optionally conclude that if the estimated risk of the FDD system misdiagnosing a fault, as determined by the fault's z-score, is higher than a predetermined threshold, then the operator of the FDD system may be alerted, or additionally or alternatively, the FDD system may be inhibited from diagnosing that specific fault until the estimated risk of misdiagnosis of that fault goes below the predetermined threshold associated with that specific diagnosable fault during a subsequent optimization sequence (steps 435-445). Other relevant statistics, such as the normality of the distribution of the weighted total sums obtained using the optimum set of optimization parameter values for each diagnosable fault, may optionally be computed for the operator and/or stored in database 30.

ASPECTS

It is noted that any of aspects 1-13 below can be combined with each other in any combination and combined with any of aspects 14-20. Any of aspects 14-20 can be combined with each other in any combination.

Aspect 1. An HVAC fault detection method, comprising receiving, at a processor, signals indicative of sensed HVAC system operating parameters from a data gathering device of an HVAC system; identifying which of the plurality of sensed HVAC system operating parameters exceeds a parameter threshold to determine a set of error parameters; determining, from the set of error parameters, a potential fault and a corresponding fault threshold; multiplying each error parameter by a predetermined weighting factor to generate a weighted error parameter; summing the weighted error parameter to generate a summed value; confirming that the potential fault is a detected fault in response to a determination that the summed value exceeds the fault threshold; storing, in a database, a dataset including a set of optimization parameters comprising the parameter thresholds, the predetermined weighting factors, and the fault threshold.

Aspect 2. The HVAC fault detection method in accordance with aspect 1, wherein the set of optimization parameters further comprises parameters selected from the group consisting of sensed HVAC system operating parameters, the set of error parameters, and the detected fault.

Aspect 3. The HVAC fault detection method in accordance with any of aspects 1-2, further comprising transmitting a fault message indicative of the identified fault.

Aspect 4. The HVAC fault detection method in accordance with any of aspects 1-3, further comprising providing an initial set of parameter thresholds.

Aspect 5. The HVAC fault detection method in accordance with any of aspects 1-4, further comprising performing noise reduction on at least one of the received signals.

Aspect 6. The HVAC fault detection method in accordance with any of aspects 1-5, further comprising normalizing an HVAC system operating parameter to fall within a standardized range.

Aspect 7. The HVAC fault detection method in accordance with any of aspects 1-6, further comprising receiving, at the processor, feedback data indicative of whether the detected fault is an actual fault; and storing, in the dataset, the feedback data.

Aspect 8. The HVAC fault detection method in accordance with any of aspects 1-7, further comprising selecting, from the database, a plurality of datasets having a common detected fault; identifying, within the selected plurality of datasets, each unique set of optimization parameters; obtaining, for each of the selected plurality of datasets, a weighted total sum of the optimization parameters; determining a z-score for each set of weighted total sums of the optimization parameters; identifying the set of optimization parameters having the most negative z-score; and utilizing the set of optimization parameters having the most negative z-score as predetermined weighting factors.

Aspect 9. The HVAC fault detection method in accordance with any of aspects 1-8, further comprising comparing the z-score of the set of optimization parameters having the most negative z-score to a threshold.

Aspect 10. The HVAC fault detection method in accordance with any of aspects 1-9, further comprising transmitting an alert in response to the comparing.

Aspect 11. The HVAC fault detection method in accordance with any of aspects 1-10, further comprising inhibiting detection of the common detected fault in response to the comparing.

Aspect 12. The HVAC fault detection method in accordance with any of aspects 1-11, further comprising determining a mean of each set of weighted total sums of the optimization parameters; and determining a standard deviation of each set of weighted total sums of the optimization parameters.

Aspect 13. The HVAC fault detection method in accordance with any of aspects 1-12, wherein the z-score is computed in accordance with the formula z-score=(fault threshold—mean of each set of weighted total sums)/the standard deviation mean of each set of weighted total sums.

Aspect 14. An HVAC fault detection system, comprising a data gathering module configured for receiving HVAC system operating parameters from components of an HVAC system and for transmitting the received HVAC system operating parameters to a recipient device; a data analysis module configured for receiving HVAC system operating parameters from the data gathering module and comprising: a database configured for storing received HVAC system operating parameters; a processor operatively coupled to the database; a memory operatively coupled to the processor and including a set of executable instructions which, when executed by the processor, cause the processor to identify which of the plurality of sensed HVAC system operating parameters exceeds a parameter threshold to determine a set of error parameters; determine, from the set of error parameters, a potential fault and a corresponding fault threshold; multiply each error parameter by a predetermined weighting factor to generate a set of weighted error parameters; sum the set of weighted error parameters to generate a summed value; confirm that the potential fault is a detected fault in response to a determination that the summed value exceeds the fault threshold; and store, in the database, a dataset including a set of optimization parameters comprising the parameter thresholds, the predetermined weighting factors, and the fault threshold.

Aspect 15. The HVAC fault detection system in accordance with aspect 14, wherein the memory includes executable instructions that further cause the processor to cause a transmission of a fault message indicative of the identified fault.

Aspect 16. The HVAC fault detection system in accordance with any of aspects 14-15, wherein the memory includes executable instructions that further cause the processor to normalize an HVAC system operating parameter to fall within a standardized range.

Aspect 17. The HVAC fault detection system in accordance with any of aspects 14-16, wherein the memory includes executable instructions that further cause the processor to identify, within the selected plurality of datasets, each unique set of optimization parameters; obtain, for each of the selected plurality of datasets, a weighted total sum of the optimization parameters; determine a z-score for each set of weighted total sums of the optimization parameters; identify the set of optimization parameters having the most negative z-score; and utilize the identified set of optimization parameters having the most negative z-score as predetermined weighting factors.

Aspect 18. The HVAC fault detection system in accordance with any of aspects 14-17, wherein the memory includes executable instructions that further cause the processor to compare the z-score of the set of optimization parameters having the most negative z-score to a threshold.

Aspect 19. The HVAC fault detection system in accordance with any of aspects 14-18, wherein the memory includes executable instructions that further cause the processor to transmit an alert in response to the comparing.

Aspect 20. The HVAC fault detection system in accordance with any of aspects 14-19, wherein the memory includes executable instructions that further cause the processor to compute the z-score in accordance with the formula z-score=(fault threshold—mean of each set of weighted total sums)/the standard deviation mean of each set of weighted total sums.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A heating, ventilation and air conditioning (HVAC) system fault detection method for optimizing fault detection and diagnosis, comprising:
   providing an electronic data gathering device configured to acquire data from one or more components associated with the heating, ventilation and air conditioning system;
   receiving, at a server, a plurality of signals indicative of sensed HVAC system operating parameters based on data acquired by the electronic data gathering device;
   identifying, at the server coupled to a database, a sensed operating parameter of the plurality of the signals indicative of sensed HVAC system operating parameters that exceeds a parameter threshold to determine a set of error parameters;
   normalizing, at the server, the sensed operating parameter according to a defined scale;
   determining, at the server, from the set of error parameters, a potential fault and a corresponding fault threshold;
   multiplying, at the server, each error parameter by a predetermined weighting factor to generate a set of weighted error parameters;
   summing, at the server, the set of weighted error parameters to generate a summed value;
   confirming, at the server, that the potential fault is a detected fault in response to a determination that the summed value exceeds the corresponding fault threshold;
   storing, in the database coupled to the server, a dataset including a set of optimization parameters comprising the parameter threshold, the predetermined weighting factor, and the corresponding fault threshold;
   applying an adjustment to the server to improve accuracy of the fault detection and diagnosis; and
   performing the applying step periodically based on a predetermined time interval or on a predetermined number of instances of receiving information related to the potential fault.

2. The HVAC fault detection method in accordance with claim 1, wherein the set of optimization parameters further comprises parameters selected from the group consisting of sensed HVAC system operating parameters, the set of error parameters, and the detected fault.

3. The HVAC fault detection method in accordance with claim 1, further comprising transmitting a fault message indicative of the identified fault to a user device.

4. The HVAC fault detection method in accordance with claim 1, further comprising providing an initial set of parameter thresholds.

5. The HVAC fault detection method in accordance with claim 1, further comprising performing noise reduction on at least one of the received signals.

6. The HVAC fault detection method in accordance with claim 1, further comprising:
   receiving, at the server, feedback data indicative of whether the detected fault is an actual fault; and
   storing, in the dataset, the feedback data.

7. The HVAC fault detection method in accordance with claim 1, further comprising:
   selecting, from the database, a plurality of datasets having a common detected fault;
   identifying, within the selected plurality of datasets, each unique set of optimization parameters;
   obtaining, for each of the selected plurality of datasets, a weighted total sum of the optimization parameters;
   determining a z-score for each set of weighted total sums of the optimization parameters;
   identifying the set of optimization parameters having the most negative z-score; and
   utilizing the set of optimization parameters having the most negative z-score as predetermined weighting factors.

8. The HVAC fault detection method in accordance with claim 7, further comprising comparing the z-score of the set of optimization parameters having the most negative z-score to a threshold.

9. The HVAC fault detection method in accordance with claim 8, further comprising transmitting an alert in response to the comparing.

10. The HVAC fault detection method in accordance with claim 8, further comprising inhibiting detection of the common detected fault in response to the comparing.

11. The HVAC fault detection method in accordance with claim 7, further comprising:
   determining a mean of each set of weighted total sums of the optimization parameters; and
   determining a standard deviation of each set of weighted total sums of the optimization parameters.

12. The HVAC fault detection method in accordance with claim 11, wherein the z-score is computed in accordance with the formula z-score=(fault threshold—mean of each set of weighted total sums)/the standard deviation mean of each set of weighted total sums.

13. A heating, ventilation and air conditioning (HVAC) fault detection system for optimizing fault detection and diagnosis, comprising:
   an electronic data gathering device configured to acquire data from one or more components associated with the HVAC system;
   a server configured for receiving and analyzing a plurality of signals indicative of sensed HVAC system operating parameters from one or more sensors of an HVAC system and for transmitting the received plurality of signals indicative of sensed HVAC system operating parameters to a user device, said user device is operably connected to the server, wherein the server comprises:
      a database configured for storing the received plurality of signals indicative of sensed HVAC system operating parameters;
      a processor operatively coupled to the database;
      a memory operatively coupled to the processor and including a set of executable instructions which, when executed by the processor, cause the processor to:
         identify a sensed operating parameter of the plurality of the signals indicative of sensed HVAC system operating parameters that exceeds a parameter threshold to determine a set of error parameters;
         normalize the sensed operating parameter according to a defined scale;
         determine, from the set of error parameters, a potential fault and a corresponding fault threshold;
         multiply each error parameter by a predetermined weighting factor to generate a set of weighted error parameters;
         sum the set of weighted error parameters to generate a summed value;
         confirm that the potential fault is a detected fault in response to a determination that the summed value exceeds the corresponding fault threshold;
         store, in the database, a dataset including a set of optimization parameters comprising the parameter threshold, the predetermined weighting factor, and the corresponding fault threshold;
         apply an adjustment to the server to improve accuracy of the fault detection and diagnosis; and
         perform the applying periodically based on a predetermined time interval or on a predetermined number of instances of receiving information related to the potential fault.

14. The HVAC fault detection system in accordance with claim 13, wherein the memory includes executable instructions that further cause the processor to transmit a fault message indicative of the identified fault.

15. The HVAC fault detection system in accordance with claim 13, wherein the memory includes executable instructions that further cause the processor to:
   identify, within the selected plurality of datasets, each unique set of optimization parameters;
   obtain, for each of the selected plurality of datasets, a weighted total sum of the optimization parameters;
   determine a z-score for each set of weighted total sums of the optimization parameters;
   identify the set of optimization parameters having the most negative z-score; and
   utilize the identified set of optimization parameters having the most negative z-score as predetermined weighting factors.

16. The HVAC fault detection system in accordance with claim 15, wherein the memory includes executable instructions that further cause the processor to compare the z-score of the set of optimization parameters having the most negative z-score to a threshold.

17. The HVAC fault detection system in accordance with claim 15, wherein the memory includes executable instructions that further cause the processor to transmit an alert in response to the comparing.

18. The HVAC fault detection system in accordance with claim 15, wherein the memory includes executable instructions that further cause the processor to compute the z-score in accordance with the formula z-score=(fault threshold—mean of each set of weighted total sums)/the standard deviation mean of each set of weighted total sums.

* * * * *